(No Model.)
J. F. WEBB.
PROCESS OF EXTRACTING GOLD AND SILVER FROM ORES.
No. 578,089. Patented Mar. 2, 1897.
Fig. I.
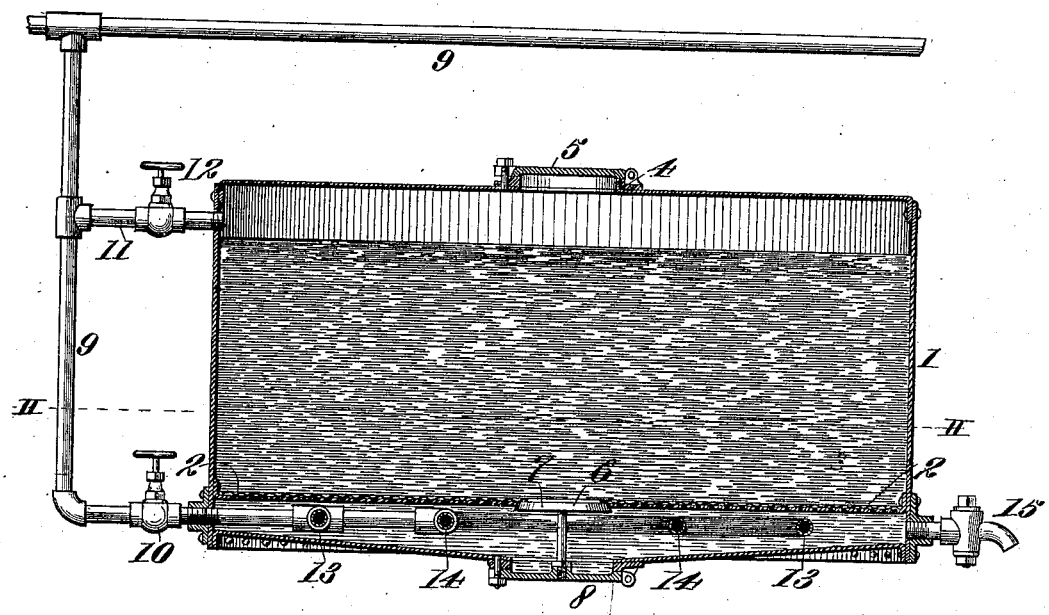
Fig. II.
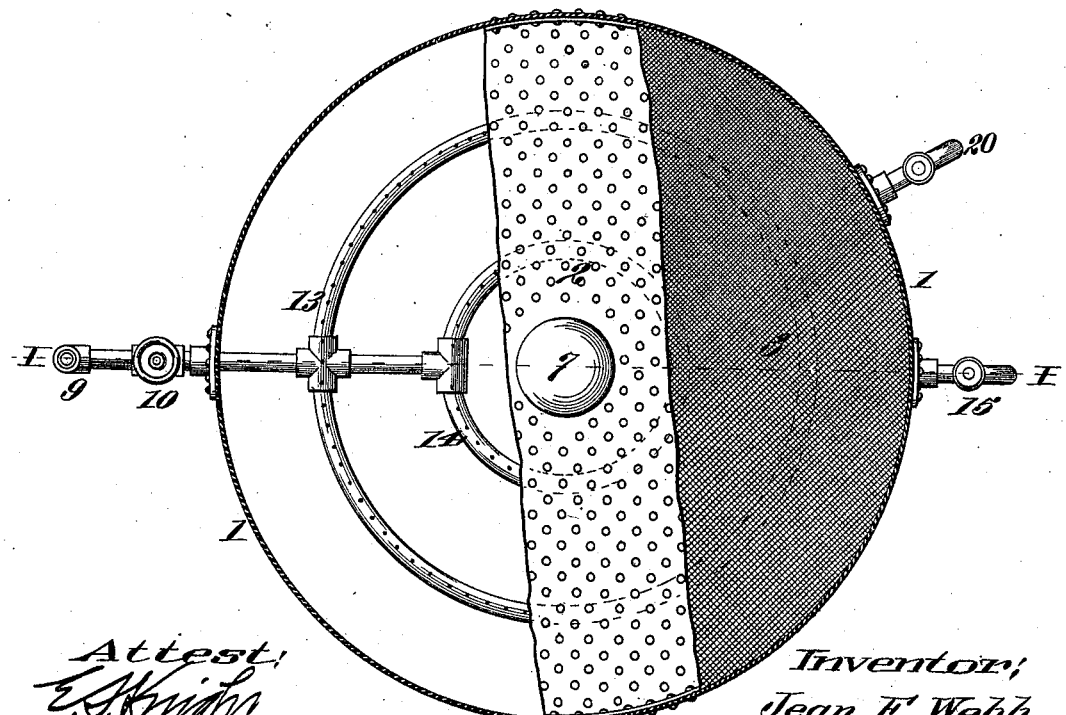
Attest:
E. S. Knight
N. Finley
Inventor:
Jean F. Webb.
By Knight Bro'
attys

UNITED STATES PATENT OFFICE.

JEAN F. WEBB, OF ST. LOUIS, MISSOURI.

PROCESS OF EXTRACTING GOLD AND SILVER FROM ORES.

SPECIFICATION forming part of Letters Patent No. 578,089, dated March 2, 1897.

Application filed June 20, 1896. Serial No. 596,261. (No specimens.)

*To all whom it may concern:*

Be it known that I, JEAN F. WEBB, a citizen of the United States, residing at the city of St. Louis, in the State of Missouri, have invented a certain new and useful Improved Method of Obtaining Gold, &c., of which the following is a full, clear, and exact description, reference being had to the accompanying drawings, forming part of this specification.

My invention has principally for its object the obtaining of gold from its ores; but it may be used for obtaining silver from its ores when found in combination with gold or alone.

According to the methods now commonly employed in the recovery of gold and silver from their ores by means of solvent solutions of potassium cyanid the ores, after being first crushed to the size desired, are placed in large vats or tanks and then flooded or saturated with the solvent solution and allowed to stand and leach until the solution has eaten out or extracted a greater or less percentage of the values of the ores. The solution is then drained or drawn off through the false bottom of the tank, and the gold or silver that is held in solution is then precipitated by means of zinc or other methods of recovery. Experience and chemistry have shown that the chemical activity of a solvent solution of potassium cyanid in the extraction of gold or silver depends largely upon the amount of oxygen present during the leaching process.

Various attempts to furnish artificial oxygen have been made by adding to the solvent solution of potassium cyanid other chemicals, such as permanganate of potash, ferricyanid of potassium, &c. It has also been proven that the presence of an increased supply of oxygen not only increases the chemical activity of the potassium cyanid during the leaching process, but that a much smaller quantity of the potassium cyanid is used up and lost. When the leaching is completed and the solution drawn off for precipitation, it is usual to wash the mass of leached ore with clear water to take up as much as possible of the solution which does not drain out, but it is not perfectly done by present methods, as assays of the tailings prove.

My invention or process for the extraction of gold and silver from their crushed ores by the potassium-cyanid method has many advantages, among which are, first, the saving of labor and the cost of chemicals in producing artificial oxygen to accelerate the chemical action of the potassium cyanid; second, the furnishing of a constant supply of pure natural oxygen to increase the chemical activity of the solvent solution during the leaching process, this supply being under control, so as to be increased or diminished at will during the leaching process; third, the shortening of the time required for leaching, thus increasing the capacity of a given number of leaching-vats; fourth, the saving of a percentage of potassium cyanid lost by present methods; fifth, the complete washing or extraction from the leached ores of all the sovent solution when leaching is completed. I accomplish these objects by connecting one or a series of leaching-vats with air-pipes from an air-compressor, thus introducing atmospheric air or natural oxygen for chemical action with the potassium-cyanid solution for the extraction of precious metals. By connecting the leaching-vats with an air-compressor I am enabled to introduce jets or currents of pure air into the space under the false bottom of the vats. These currents of compressed air at once force their way upward through the saturated mass of ore and supply the desired quantity of oxygen to the potassium cyanid. They are so controlled by a system of valves that the whole power of the compressor can be thrown into either the top or bottom of the vat, if so desired, or they can be distributed through a series of vats, or they can be cut off entirely from each or any of the vats at the will of the operator.

Referring to the accompanying drawings, Figure 1 illustrates a section taken on line II, Fig. 2, vertically through the central portion of the apparatus that I employ in carrying out my method. Fig. 2 illustrates a horizontal section taken on line II II, Fig. 1, a portion of the false bottom being broken away to afford a view beneath the bottom.

1 designates the vat or tank, which is provided with a perforated false bottom 2. The perforated bottom is covered by a layer 3 of burlap or similar material. The vat or tank is provided with a manhole 4, that is arranged to be closed by a hinged lid or manhole-cover 5. Centrally located in the false bottom 2 is an opening 6, that is designed to be closed by a valve 7, carried by a hinged trap-door 8 in the bottom of the vat, such valve being provided to permit the removal of the tailings from the vat through the opening closed by the trap-door after the valuable metal has been extracted.

9 designates the air-pipe which leads to the bottom of the vat and is controlled by a valve 10 and from which connection to the upper part of the vat is provided by means of a branch pipe 11, controlled by a valve 12.

13 and 14 designate circular perforated pipes connected to the pipe 9 on the interior of the vat. The perforations in the pipes 13 and 14 are in the upper sides of the pipes and are presented toward the false bottom 2.

16 designates a drain-cock through which the solution, with the precious metal held therein, is drawn off to be precipitated.

In use the vat is supplied with crushed ore until nearly full. The solvent solution of potassium cyanid of the proper strength is then run in until the ore is thoroughly saturated and covered with it. The current of compressed air is then turned on gently into the space beneath the false bottom of the vat, from whence it rises bubbling through the mass. As the ore disintegrates and shows a tendency to settle as mud on the bottom of the vat the current can be increased until settling is impossible, and kept so until the leaching is completed, the vats being open at top during the leaching process. After the leaching is completed the lid of the vat is fastened down on an air-tight gasket, the drain-cock is opened, and the current of compressed air is all turned into the top of the vat between the saturated ore and the lid or cover of the vat through branch pipe 11. This at once forces the solution downward through the mass, and the current is gradually increased until all the solution is driven out of the ore through the drain-cock. The solution on its discharge from the vat through the drain-cock is conveyed to and over a zinc surface, (not shown,) where the precious metal is precipitated, or other methods of precipitation or recovery may be employed. The crushed mass is then flooded with pure water, the lid is opened, and the current of compressed air shut off from above and turned on below in such strength that the mass is violently agitated until all the solution has been blended with and taken up by the water. The current is now again reversed, and the water solution driven out through another drain-cock 20 and led to a reservoir, (not shown,) where it is strengthened or enriched for use on another charge of ore. The refuse mass is then thrown out of the vat and the vat is ready to be refilled with freshly-crushed ore.

I may state as an incident to my invention that the described use of compressed air acts as an excellent agitator to keep the ore stirred up and prevent its settling during the leaching process.

I do not confine myself to the exact arrangement of pipes and vats shown in the drawings. The main-supply air-pipe may be placed overhead on the building-joists or under the floor. Neither do I confine myself to the form of vat shown. It may be provided with two or more trap doors or lids to facilitate loading, and it may also have trap-doors or manholes in the sides, through which it may be unloaded. The process may be used with any arrangement of vats and pipes for compressed air.

With my method the supply of oxygen may be increased or diminished at will during the leaching process, so as to obtain the best chemical effects of the oxygen upon the potassium cyanid.

I am aware that solvent solutions of cyanid of potassium have long been used for the extraction of gold and silver from their ores; but heretofore it has always been thought necessary to employ artificial oxygen produced by other chemicals to accelerate the chemical action of the potassium cyanid; but I have discovered that this may be done by the oxygen contained in atmospheric air.

I claim as my invention—

1. The process or method herein described for the extraction of gold and silver from their crushed ores, consisting in saturating the ores in a solution of potassium cyanid, and then applying a current of air from beneath in substantially the manner set forth.

2. The process or method herein described for the extraction of gold and silver from their crushed ores, consisting in saturating the ores in a solution of potassium cyanid and then applying a current of compressed air from beneath and maintaining the same throughout the leaching process, substantially as set forth.

3. The process or method herein described for the extraction of gold and silver from their crushed ores, consisting in saturating the ores in a solvent solution of potassium cyanid then applying a current of compressed air from beneath and maintaining the same throughout the leaching process, then shutting off the current, then applying a current of compressed air on top of the solution after the ore-containing vat has been closed at top and a drain at the bottom has been opened and maintaining the same until the solution has been driven out of the ore, substantially as set forth.

4. The process or method herein described for the extraction of gold and silver from their crushed ores, consisting in saturating the ores in a solvent solution of potassium cyanid, then applying a current of compressed air from beneath and maintaining the same throughout the leaching process, then shutting off the current, then applying a current of compressed air on top of the solution after the ore-containing vat has been closed at top and a drain at the bottom has been opened, and maintaining the same until the solution has been driven out of the ore, then shutting off the current of air, then admitting water to the vat, then introducing a compressed-air current at the bottom of the vat and finally introducing a current of compressed air on top after the vat has been again closed at top and a drain opened at bottom, substantially as set forth.

JEAN F. WEBB.

In presence of—
 GEO. H. KNIGHT,
 N. FINLEY.